United States Patent
Yoshida et al.

(10) Patent No.: US 8,896,256 B2
(45) Date of Patent: Nov. 25, 2014

(54) REFLECTION ENCODER, SERVO MOTOR, AND SERVO UNIT

(71) Applicant: Kabushiki Kaisha Yaskawa Denki, Kitakyushu-shi (JP)

(72) Inventors: Yasushi Yoshida, Fukuoka (JP); Yuji Arinaga, Fukuoka (JP); Shirou Yoshidomi, Fukuoka (JP); Yasuhiro Matsutani, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/867,132

(22) Filed: Apr. 22, 2013

(65) Prior Publication Data

US 2013/0229138 A1 Sep. 5, 2013

Related U.S. Application Data

(63) Continuation of application No. PCT/JP2011/075690, filed on Nov. 8, 2011.

(30) Foreign Application Priority Data

Nov. 8, 2010 (JP) ................................. 2010-249535

(51) Int. Cl.
  *G05B 1/06* (2006.01)
  *H02K 11/00* (2006.01)
  *G05D 3/12* (2006.01)
  *G01D 5/347* (2006.01)
(52) U.S. Cl.
  CPC .......... *G01D 5/3473* (2013.01); *H02K 11/0026* (2013.01); *G05D 3/125* (2013.01); *G01D 5/34715* (2013.01)
  USPC ....... 318/640; 318/560; 318/565; 318/568.16

(58) Field of Classification Search
  USPC ........ 318/640, 560, 565, 568.16; 250/231.13, 250/231.14, 231.18, 230, 233
  See application file for complete search history.

(56) References Cited

U.S. PATENT DOCUMENTS 4,914,437 A * 4/1990 Kibrick et al. .................... 341/3
5,241,172 A * 8/1993 Lugaresi .................. 250/231.16

(Continued)

FOREIGN PATENT DOCUMENTS

JP 60-134117 U 9/1985
JP 63-317720 12/1988

(Continued)

OTHER PUBLICATIONS

International Search Report for corresponding International Application No. PCT/JP2011/075690, Feb. 14, 2012.

(Continued)

*Primary Examiner* — Bentsu Ro
*Assistant Examiner* — Thai Dinh
(74) *Attorney, Agent, or Firm* — Mori & Ward, LLP

(57) ABSTRACT

Reflected light can be effectively utilized by increasing a light receiving area. Incremental light receiving element groups are separated and arranged in the circumferential direction of a rotating unit while placing a light source therebetween. First and second absolute light receiving element groups are arranged at both sides of the outside and inside of the light source in the radial direction of the rotating unit. As a result, first and second absolute light receiving elements are continuously arranged, and also the incremental light receiving element groups and the absolute light receiving element groups can be arranged to surround the periphery of the light source from four directions.

21 Claims, 11 Drawing Sheets

(56) References Cited

U.S. PATENT DOCUMENTS

| | | | | |
|---|---|---|---|---|
| 5,451,776 | A | * | 9/1995 | Kolloff et al. ............ 250/231.18 |
| 5,917,182 | A | * | 6/1999 | Ishizuka ................... 250/237 G |
| 6,093,928 | A | * | 7/2000 | Ohtomo et al. .......... 250/231.13 |
| 6,639,207 | B2 | * | 10/2003 | Yamamoto et al. ...... 250/231.14 |
| 6,885,457 | B1 | * | 4/2005 | Michel et al. ................. 356/499 |
| 7,220,960 | B2 | * | 5/2007 | Ito ............................ 250/231.13 |
| 7,482,575 | B2 | | 1/2009 | Sidor et al. |
| 7,875,844 | B2 | * | 1/2011 | Sheu et al. ............... 250/231.16 |
| 8,258,459 | B2 | | 9/2012 | Yoshida et al. |
| 2010/0051792 | A1 | * | 3/2010 | Sheu et al. ............... 250/231.13 |

FOREIGN PATENT DOCUMENTS

| | | |
|---|---|---|
| JP | 08-304118 | 11/1996 |
| JP | 2005-121593 | 5/2005 |
| JP | 2005-291822 | 10/2005 |
| JP | 2006-105708 | 4/2006 |
| JP | 2010-066272 | 3/2010 |
| JP | 2010-096503 | 4/2010 |
| JP | 2010-210316 | 9/2010 |
| JP | 2012-108159 | 6/2012 |
| WO | 95/33180 | 12/1995 |

OTHER PUBLICATIONS

Written Opinion for corresponding International Application No. PCT/JP2011/075690, Feb. 14, 2012.

Japanese Office Action for corresponding JP Application No. 2012-047662, May 25, 2014.

Russian Office Action for corresponding Russian Application No. 2013120078, Aug. 21, 2014.

* cited by examiner k: (d1+d2)/d1

REFLECTION ENCODER, SERVO MOTOR, AND SERVO UNIT

CROSS-REFERENCE TO RELATED APPLICATIONS

This application is a continuation of PCT international application Ser. No. PCT/JP2011/075690 filed on Nov. 8, 2011 which designates the United States, and which claims the benefit of priority from Japanese Patent Application No. 2010-249535, filed on Nov. 8, 2010; the entire contents of which are incorporated herein by reference.

FIELD

The present invention relates to a reflection encoder, a servo motor, and a servo unit that detect an angle of a rotating shaft of a motor.

BACKGROUND

An optical encoder includes a transmission encoder and a reflection encoder. The transmission encoder includes a light source and a light receiving element that are respectively arranged at one side and the other side of a rotating disc while placing the rotating disc therebetween. The transmission encoder makes light emitted from the light source pass through the rotating disc and makes the light receiving element receive the light. On the other hand, the reflection encoder includes a light source and a light receiving element that are arranged at only one side of a rotating disc. The reflection encoder reflects light emitted from the light source on the rotating disc and makes the light receiving element receive the light. Both of the encoders detect a rotational position and a rotational speed of a rotating shaft, to which the rotating disc is fixed, from an output signal of the light receiving element that receives substantially pulsed light in accordance with the rotation of the rotating disc.

A conventional transmission encoder is disclosed in, for example, Japanese Laid-open Patent Publication No. 2010-96503.

Because all of the light source and the light receiving element in the reflection encoder can be intensively arranged at only one side of the rotating disc, the reflection encoder is suitable for simplification and miniaturization of the configuration of device as compared with the transmission encoder. For this reason, it is the mainstream to employ the reflection encoder in recent years.

However, because a concentric light quantity distribution with the light source at its centre occurs in reflected light in the reflection encoder, it has been concerned that a light receiving area decreases depending on the arrangement of the light receiving element and thus reflected light cannot be effectively utilized.

SUMMARY

A reflection encoder according to an embodiment comprising: a rotating unit configured to be rotatably arranged around a rotating shaft center and on which an incremental pattern is formed along a circumferential direction; and a board configured to be arranged opposite the rotating unit and to include a light source configured to emit light toward the rotating unit and an incremental light receiving element group configured to include a plurality of incremental light receiving elements for receiving reflected light from the incremental pattern, in which the incremental light receiving elements are separated and arranged on the board in a circumferential direction of the rotating unit while placing the light source therebetween.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment of the present invention will be explained with reference to the drawings.

Figure 1:
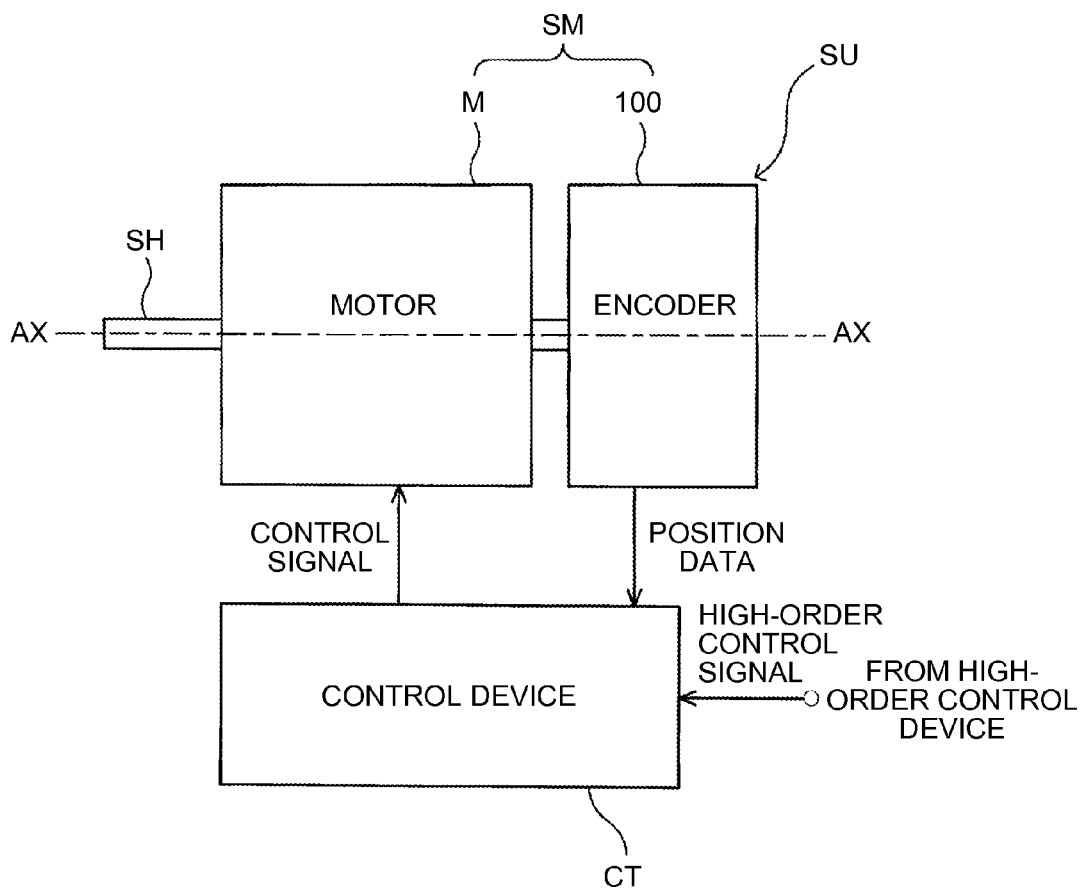
FIG. 1 is an explanation diagram explaining the schematic configuration of a servo unit according to an embodiment.

First, the schematic configuration of a servo unit according to the present embodiment will be explained with reference to FIG. 1. FIG. 1 is an explanation diagram explaining the schematic configuration of a servo unit SU according to the present embodiment.

As illustrated in FIG. 1, the servo unit SU according to the present embodiment includes a servo motor SM and a control device CT. Furthermore, the servo motor SM includes a reflection encoder 100 and a motor M.

The motor M is an example of a power generation source that does not include the reflection encoder 100. Only the motor M may be referred to as a servo motor in some cases. However, in the present embodiment, the configuration including the motor M and the reflection encoder 100 is referred to as the servo motor SM. The motor M has a shaft SH on at least one end side thereof and outputs torque by rotating the shaft SH around a rotating shaft center AX.

The type of the motor M is not particularly limited if it is a motor that is controlled based on position data (it may include data such as speed data). Furthermore, the motor M is not limited to an electrically operated motor that uses electricity as a power source. For example, the motor M may be a motor, which uses another power source, such as a hydraulic motor, an air motor, and a steam motor. However, for convenience of explanation, the case when the motor M is an electrically operated motor will be explained below.

The reflection encoder 100 is connected to an end portion that is opposite to a torque output end of the shaft SH of the motor M. The reflection encoder 100 detects the position of the shaft SH to detect a relative position (a relative angle from a base angle) and an absolute position (an absolute angle) of a rotating object (it may be the shaft SH) of the motor M, and outputs position data that indicates the position.

The arrangement position of the reflection encoder 100 is not particularly limited to the example illustrated in the present embodiment. For example, the reflection encoder 100 may be placed to be directly connected to the output end side of the shaft SH, or may be connected to the shaft SH via other mechanisms such as a speed reducer, a rotation direction converter, and a brake.

The control device CT acquires the position data from the reflection encoder 100 to control the rotation of the motor M on the basis of this position data. Therefore, in the present embodiment in which an electrically operated motor is used as the motor M, the control device CT controls a current or a voltage to be applied to the motor M on the basis of the position data so as to control the rotation of the motor M. Furthermore, the control device CT can acquire a high-order control signal from a high-order control device (not illustrated) and control the motor M in such a manner that the position or speed indicated with the high-order control signal is output from the shaft SH of the motor M. When the motor M uses another power source such as a hydraulic motor, an air motor, and a steam motor, the control device CT can control a supply to the power source to control the rotation of the motor M.

Figure 2:
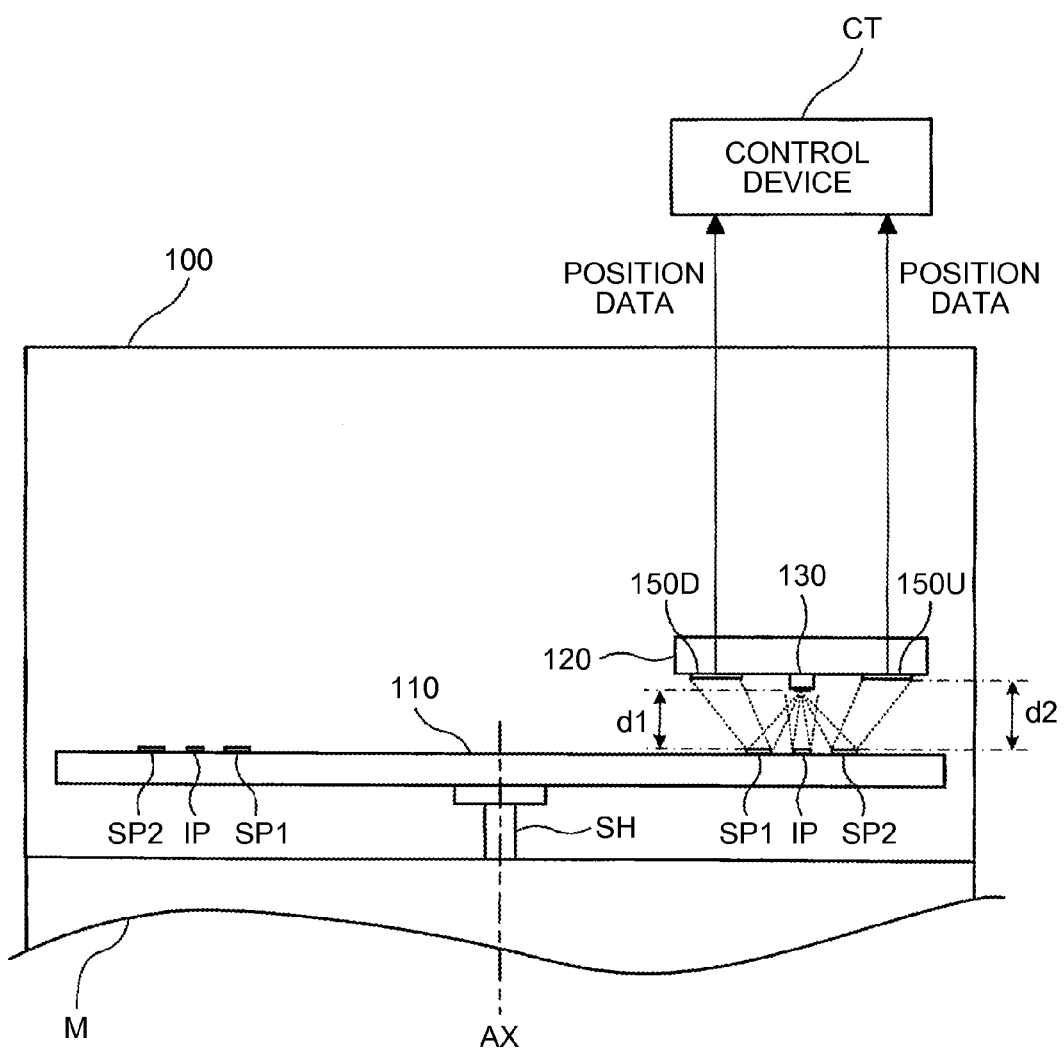
FIG. 2 is an explanation diagram explaining the schematic configuration of a reflection encoder according to the present embodiment.
Figure 3:
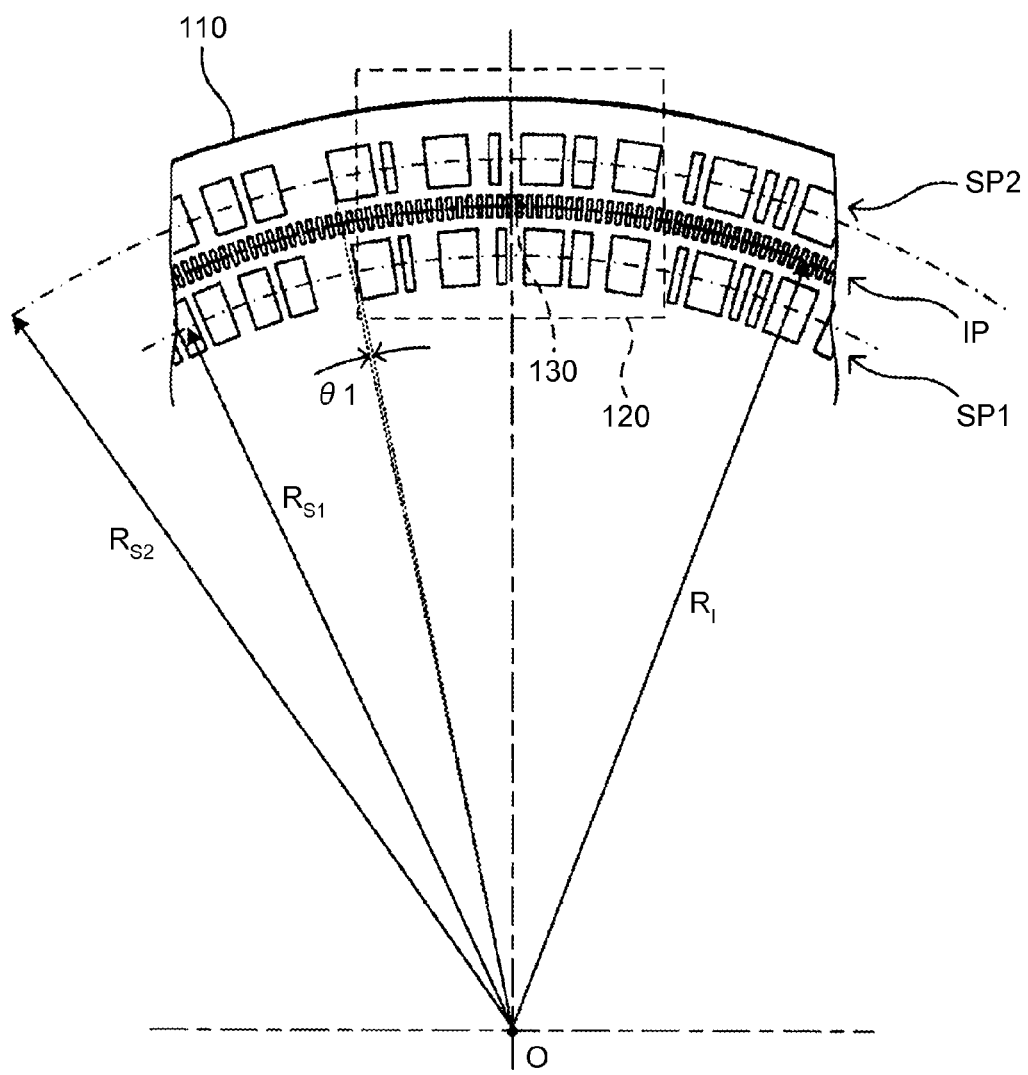
FIG. 3 is a plan view illustrating a part of a pattern forming surface of a rotating disc included in the reflection encoder according to the present embodiment.
Figure 4:
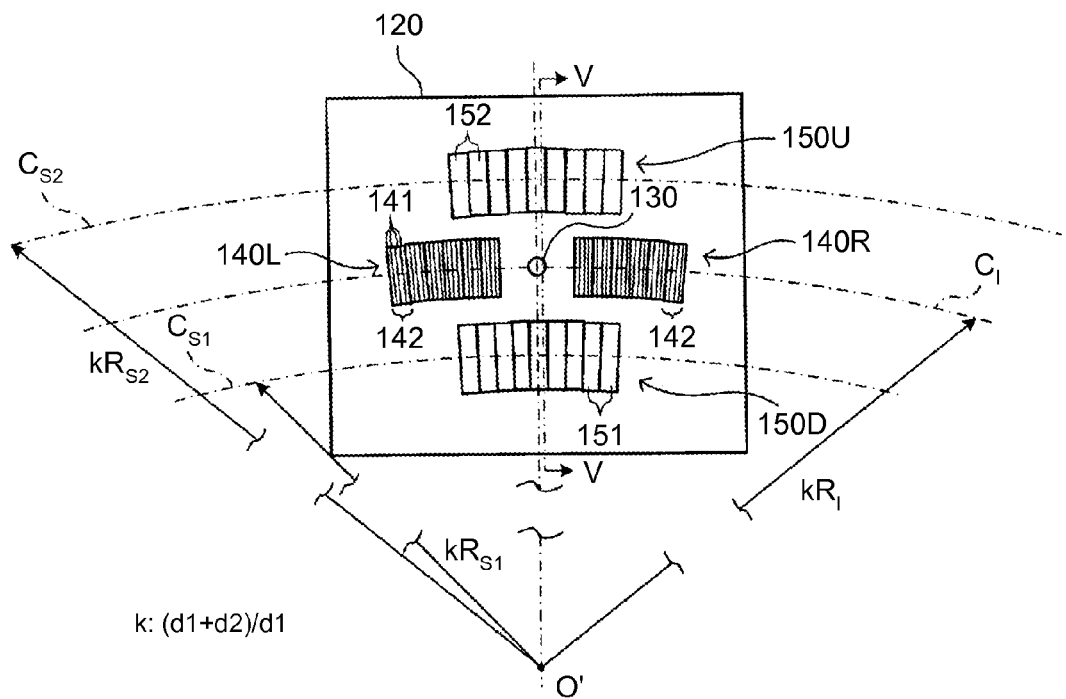
FIG. 4 is an arrangement diagram illustrating the arrangement of light receiving elements on a board included in the reflection encoder according to the present embodiment.
Figure 5:
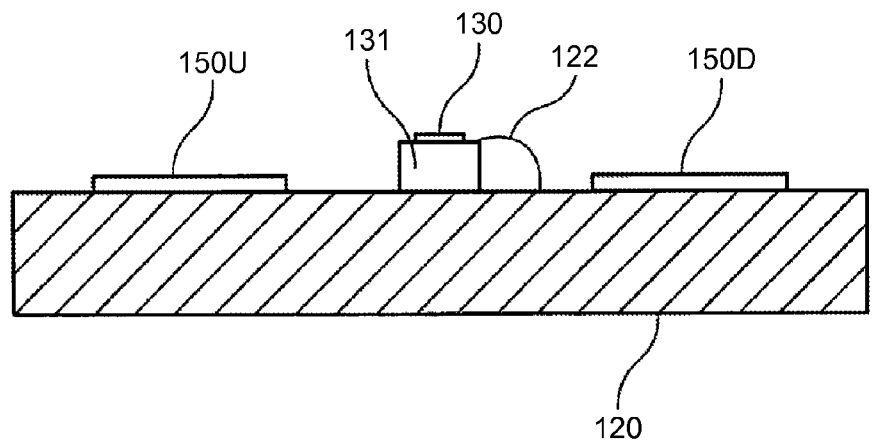
FIG. 5 is a vertical cross-sectional view of the board explaining a light source when being viewed from a V-V cross section in FIG. 4.

Next, the configuration of the reflection encoder 100 according to the present embodiment will be explained with reference to FIGS. 2 to 5. FIG. 2 is an explanation diagram explaining the schematic configuration of the reflection encoder 100 according to the present embodiment. FIG. 3 is a plan view illustrating a part of a pattern forming surface of a rotating disc 110 included in the reflection encoder 100. FIG. 4 is an arrangement diagram illustrating the arrangement of light receiving elements on a board 120 included in the reflection encoder 100. FIG. 5 is a vertical cross-sectional view of the board 120 explaining a light source when being viewed from a V-V cross section in FIG. 4.

As illustrated in FIG. 2, the reflection encoder 100 according to the present embodiment includes the rotating disc 110 and the board 120. The rotating disc 110 is connected to the shaft SH, and the board 120 is placed opposite the rotating disc 110 and is supported on a supporting member (not illustrated). Herein, the rotating disc 110 corresponds to a rotating unit, and further corresponds to a means for receiving light and reflecting the light.

The rotating disc 110 is formed in the shape of a disc as illustrated in FIG. 3, and is placed so that a disc center O is substantially identical with the rotating shaft center AX. The rotating disc 110 is connected to the shaft SH, which can rotate around the rotating shaft center AX, via a hub, for example. Therefore, the rotating disc 110 is placed to be able to rotate around the rotating shaft center AX in accordance with the rotation of the motor M.

As illustrated in FIG. 3, an incremental pattern IP and serial absolute patterns SP are concentrically formed on the rotating disc 110 along its circumferential direction. In this case, the rotating disc 110 is formed of materials transmitting or absorbing light, for example. The incremental pattern IP and the serial absolute patterns SP are patterned by forming reflection slits on concentric circles by using a method for depositing materials having high reflectance, for example, on the rotating disc 110 formed of materials transmitting or absorbing light.

By forming the reflection slits at a predetermined pitch and at regular intervals, the incremental pattern IP has a pattern in which reflection and absorption or transmission of light are repeated at the pitches. Because the light receiving elements corresponding to phases to be described below detect one periodic signal (for example, a sine wave or a pulse wave) every time the rotating disc 110 rotates by a one pitch (repeating interval of reflection slit), the one pitch interval is expressed with an electrical angle that is considered as 360 degrees per one pitch.

The serial absolute patterns SP have a first serial absolute pattern SP1 formed on the inner circumferential side of the incremental pattern IP and a second serial absolute pattern SP2 formed on the outer circumferential side of the incremental pattern IP. The first serial absolute pattern SP1 and the second serial absolute pattern SP2 have a pattern, in which the absolute position of the rotating disc 110 can be uniquely expressed by combining the positions of the reflection slits within a predetermined angle, instead of the repeating pattern of a predetermined pitch such as the incremental pattern IP. Therefore, the light receiving elements to be described below acquire a signal that corresponds to a combination of the positions of the reflection slits within the predetermined angle and thus the reflection encoder according to the present embodiment can specify an absolute position corresponding to the signal.

In the present embodiment, the first serial absolute pattern SP1 and the second serial absolute pattern SP2 are the same pattern. However, patterns on the same position in the circumferential direction are formed to deviate from each other by an angle θ1 in such a manner that the patterns deviate from each other by 180 degrees in an electrical angle corresponding to a half pitch of the incremental pattern IP.

The first serial absolute pattern SP1 and the second serial absolute pattern SP2 are formed to deviate from each other by the angle θ1 in the circumferential direction as described above. Therefore, an output signal obtained from reflected light of the first serial absolute pattern SP1 and an output signal obtained from reflected light of the second serial absolute pattern SP2 have different phases whose difference is 180 degrees. Because signals whose phases are different by 180 degrees are obtained as described above, the reflection encoder 100 according to the present embodiment can use a signal obtained from a pattern, which is not in an unstable region, like turning points of the detection pattern to specify an absolute position and thus can stably detect the absolute position. In this sense, although the phase difference is not limited to 180 degrees, the case where the phase difference is 180 degrees can increase an interval between unstable regions of signals obtained from the patterns.

As illustrated in FIG. 4, a light source 130, incremental light receiving element groups 140L and 140R, a first absolute light receiving element group 150D, and a second absolute light receiving element group 150U are provided on a surface of the board 120 that is opposed to the rotating disc 110. The light source 130 is a means that emits light toward the rotating disc 110. Each of the incremental light receiving element groups 140L and 140R includes a plurality of incremental light receiving elements 141 that receive reflected light from the incremental pattern IP. Herein, the incremental light receiving element groups 140L and 140R correspond to a means for receiving light having the incremental pattern on both sides of the light source in the circumferential direction and for detecting signals having a phase difference. The first absolute light receiving element group 150D includes a plurality of first absolute light receiving elements 151 that receive reflected light from the first serial absolute pattern SP1. The second absolute light receiving element group 150U includes a plurality of second absolute light receiving elements 152 that receive reflected light from the second serial absolute pattern SP2. Herein, the absolute light receiving element groups 150D and 150U correspond to a means for receiving light having the serial absolute pattern on at least one of an outside and an inside of the light source in a radial direction of the rotating unit and for detecting a position of the rotating shaft.

As illustrated in FIG. 3, the board 120 is placed in such a manner that the light source 130 is located at a middle position of the incremental pattern IP in a radial direction (the position of a radius $R_I$ from the disc center O). As a result, the first absolute light receiving element group 150D, the incremental light receiving element groups 140L and 140R, and the second absolute light receiving element group 150U, which are arranged on the board 120, are respectively located at radial direction positions that correspond to the first serial absolute pattern SP1, the incremental pattern IP, and the second serial absolute pattern SP2, which are formed on the rotating disc 110.

Each of the incremental light receiving element groups 140 includes the plurality of incremental light receiving elements 141, in which the area corresponding to one pitch of the incremental pattern IP is divided into four and the four incremental light receiving elements 141 that output a signal every 90 degrees in view of the electrical angle are defined as one set (reference number 142 in FIG. 4), in order to detect four optical signals having different phases. Herein, the incremental light receiving element groups 140 have a configuration that sets 142 each of which includes the four incremental light receiving elements 141 are arranged in an array pattern along the circumferential direction ($C_I$ direction in FIG. 4) of the rotating disc 110.

The four optical signals having different phases indicate A+ phase (0 degrees), B+ phase (90 degrees) whose phase is shifted by around 90 degrees from A+ phase, A− phase (180 degrees) whose phase is shifted by around 180 degrees from A+ phase, and B− phase (270 degrees) whose phase is shifted by around 270 degrees from A+ phase. An objective of using a signal whose phase is different 90 degrees, for example, an optical signal of B+ phase in addition to the optical signal of A+ phase is to detect the rotation direction of the rotating disc 110 in accordance with which of A+ phase and B+ phase is first detected. Furthermore, an objective of using signals whose phases are different 180 degrees, namely, optical signals of A− phase and B− phase in addition to A+ phase and B+ phase is to ensure reliability of optical signals. The reason of arranging the plurality of sets 142 along the circumferential direction that an influence of fluctuation of amounts of receiving light can be reduced by averaging because places at which optical signals corresponding to phases are detected are dispersed in a wide range.

The present inventors have focused attention on the function of the incremental light receiving elements 141 of the incremental light receiving element group 140, and have found that the incremental light receiving element group 140 is divided and arranged unlike with the absolute light receiving element group 150. For example, FIG. 4 is an example in which the incremental light receiving element group 140 is divided and arranged in units of sets. In this example, the incremental light receiving element groups 140L and 140R each of which includes the six sets 142 are separated and arranged in the circumferential direction (the CI direction in FIG. 4) while placing the light source 130 therebetween. Moreover, in this example, because the incremental light receiving element groups 140L and 140R and the light source 130 are arranged along the circumferential direction, the positions of the incremental light receiving element groups 140L and 140R in the radial direction of the rotating disc 110 are the same as that of the light source 130.

Each of the incremental light receiving element groups 140 is not necessarily divided in the units of sets. For example, assuming that the incremental light receiving elements 141 that detect the optical signals of A+ phase (0 degrees), B+ phase (90 degrees), A− phase (180 degrees), and B− phase (270 degrees) are respectively 141a, 141b, 141c, and 141d, the example described above is an example of arranging the incremental light receiving element groups 140 and the light source 130, like . . . , [141a to 141d], [141a to 141d], the light source 130, [141a to 141d], [141a to 141d], . . . , by using the incremental light receiving elements 141a to 141d included in the set 142 as a group. Alternatively, the arrangement may be performed like . . . , [141a to 141d], [141a, 141b], the light source 130, [141c, 141d], [141a to 141d], . . . , by dividing the set 142 in the middle of the set.

When a distance from the disc center O of the rotating disc 110 to the central position of the incremental pattern IP is defined as $R_I$ after projecting the positions of the light source 130 and the light receiving elements on the rotating disc 110 in the state where the board 120 is opposed to the rotating disc 110 as illustrated in FIG. 3, the CI direction is a circumferential direction whose radius is $kR_I$ and whose center is a base position O' that is located at a distance of $kR_I$, which is k times (k=(d1+d2)/d1) of the distance $R_I$, from the light source 130 as illustrated in FIG. 4. In other words, the base position O' is located at a position being away from, a position on the rotating disc 110 corresponding to the light source 130, by a distance kr toward the center O on a straight line passing on the position and the center O of the rotating disc 110. As illustrated in FIG. 2, this reason is that the enlarged image of the pattern is reflected and projected on the incremental light receiving element groups 140 because light emitted from the light source 130 is reflected on the rotating disc 110 and the reflected light is received by the incremental light receiving element groups 140 in the reflection encoder 100. In other words, because an optical path distance of the outgoing light from the light source 130 to the rotating disc 110 is d1 and an optical path distance of reflected light from the rotating disc 110 to the incremental light receiving element groups 140 is d2, an enlarged image obtained enlarging the incremental pattern IP by k times (k=(d1+d2)/d1) is reflected and projected on the incremental light receiving element groups 140. Therefore, the incremental light receiving element groups 140 can correspond to the enlarged image of the incremental pattern IP, which is reflected and projected, by arranging the incremental light receiving element groups 140 along the CI direction. Furthermore, the directions of the incremental light receiving elements 141 that constitute the incremental light receiving element groups 140 respectively correspond to radiation directions centering on the base position O'. As a result, the directions of the incremental light receiving elements 141 can correspond to the enlarged image of k times of the incremental pattern IP that is reflected and projected.

The first and second absolute light receiving element groups 150D and 150U are constituted so that the first absolute light receiving elements 151 and the second absolute light receiving elements 152 are arranged in an array pattern along the circumferential directions ($C_{S1}$ and $C_{S2}$ directions in FIG. 4) of the rotating disc 110. In the first and second absolute light receiving element groups 150D and 150U, it is desirable that the first absolute light receiving elements 151 and the second absolute light receiving elements 152 are continuously arranged because optical signals from the first and second serial absolute patterns SP1 and SP2 within a predetermined range are independently detected by the first absolute light receiving elements 151 and the second absolute light receiving elements 152. Therefore, according to the present embodiment, the first absolute light receiving element group 150D is arranged at the inside (downside in FIG. 4) of the light source 130 in the radial direction of the rotating disc 110 and the second absolute light receiving element group 150U is arranged at the outside (upside in FIG. 4) of the light source 130 in the radial direction of the rotating disc 110. Moreover, the first absolute light receiving element group 150D and the second absolute light receiving element group 150U are arranged at the same positions in the circumferential direction on the board 120 (circumferential-direction positions centering on the base position O' are the same). On the other hand, as described above, the first and second serial absolute patterns SP1 and SP2 are arranged to be deviated by 180 degrees in view of an electrical angle. Therefore, the first absolute light receiving element group 150D and the second absolute light receiving element group 150U respectively output signals whose phases are different by 180 degrees from each other in view of an electrical angle.

As illustrated in FIGS. 3 and 4, the $C_{S1}$ and $C_{S2}$ directions are circumferential directions of radii $kR_{S1}$ and $kR_{S2}$ centering on the base position O' assuming that distances from the disc center O of the rotating disc 110 to the central positions of the first and second serial absolute patterns SP1 and SP2 are $R_{S1}$ and $R_{S2}$. As described above, because the first and second absolute light receiving element groups 150D and 150U are arranged along the $C_{S1}$ and $C_{S2}$ directions, these groups can correspond to the enlarged images of the first and second serial absolute patterns SP1 and SP2, which are reflected and projected. Similarly, the directions of the absolute light receiving elements 151 and 152, which constitute the first and second absolute light receiving element groups 150D and 150U, are directed in a radiation direction with a central focus on the base position O'. As a result, the directions of the absolute light receiving elements 151 and 152 can correspond to the enlarged images of k times of the first and second serial absolute patterns SP1 and SP2, which are reflected and projected.

As illustrated in FIG. 5, a chip 131, on which the light source 130 is formed, is firmly fixed onto the board 120 by using a conductive adhesive such as silver paste. For example, a light emitting diode (LED) is used as the light source 130. A wiring pattern (not illustrated) is formed on the surface of the board 120, and the wiring pattern and the electrode of the light source 130 are connected by a wiring 122.

According to the reflection encoder 100 of the present embodiment described above, the incremental light receiving element groups 140L and 140R are separated and arranged in the circumferential direction of the rotating disc 110 while placing the light source 130 therebetween, and the first and second absolute light receiving element groups 150D and 150U are arranged at both sides of the outside and inside of the light source 130 in the radial direction of the rotating disc 110. As a result, while the first and second absolute light receiving elements 151 and 152 are continuously arranged, the incremental light receiving element groups 140L and 140R and the absolute light receiving element groups 150D and 150U can be arranged to surround the periphery of the light source 130 from four directions. In this way, because the arrangement of the light receiving elements can correspond to a concentric light quantity distribution centering on the light source 130, a light receiving area increases and thus reflected light can be effectively utilized. Furthermore, an SN ratio can be improved in accordance with the increase of the light receiving area.

In particular, according to the present embodiment, the first and second absolute light receiving element groups 150D and 150U are arranged at both sides of the outside and inside in the radial direction, and the incremental light receiving element groups 140L and 140R are arranged at both sides of the light source 130 to have the same radius as that of the light source 130 while placing the light source 130 therebetween. Each of the incremental light receiving element groups 140L and 140R has the sets 142 each of which includes the incremental light receiving elements 141 to obtain signals having a phase difference of a desired number (for example, four). The leads to effective utilization of reflected light as described above and to miniaturization of the device. In particular, in the present embodiment, the incremental light receiving element groups 140L and 140R are arranged so that their positions are the same as that of the light source 130 in the radial direction of the rotating disc 110. By employing this arrangement, an area can be minimized and downsized compared to a modification example illustrated in FIG. 12, for example. In particular, when employing reflection type such as the encoder of the present embodiment, it is difficult to arrange light receiving elements within a light quantity distribution of reflected light and thus it is easy to decrease a detection accuracy due to an influence of the light quantity distribution, compared to transmission type in view of a mechanical constraint or an electrical constraint. However, compared to the modification example of FIG. 12, according to the present embodiment, all the light receiving elements can be appropriately arranged in an area in which an amount of reflected light is not largely decreased and this leads to the improvement of detection accuracy.

In particular, according to the present embodiment, the first serial absolute pattern SP1 and the second serial absolute pattern SP2 are formed on the rotating disc 110, and the first absolute light receiving element group 150D and the second absolute light receiving element group 150U output signals whose phase difference is 180 degrees. As a result, among output signals of the first absolute light receiving element group 150D and the second absolute light receiving element group 150U, a signal obtained from a pattern, which is not an unstable region, like turning points of the detection pattern is used to specify an absolute position, and thus the absolute position can be stably detected. Therefore, it is possible to improve the reliability of output signals of the absolute light receiving element group 150.

Figure 9:
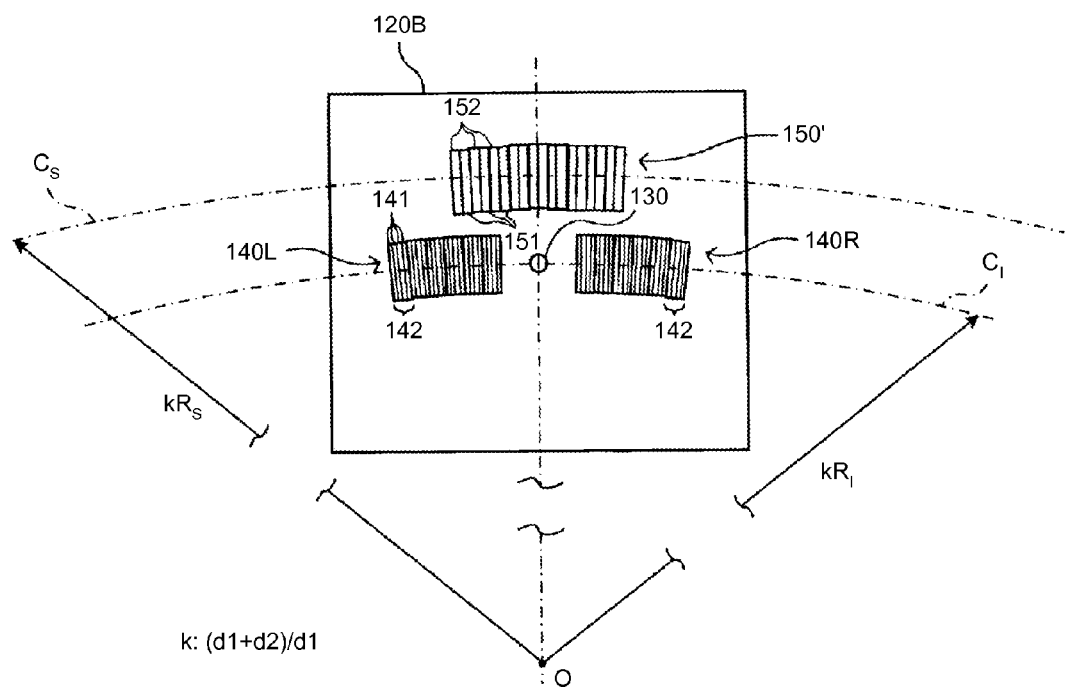
FIG. 9 is an arrangement diagram illustrating the arrangement of light receiving elements on a board included in the reflection encoder according to the alternative example in which the absolute light receiving element group is arranged at only one side in a radial direction of the light source.

Moreover, according to the present embodiment, the first and second absolute light receiving element groups 150D and 150U are arranged at both sides of the outside and inside of the light source 130 in the radial direction of the rotating disc 110. As a result, as illustrated in FIG. 9 to be described later, for example, compared to when one linear absolute light receiving element group is constituted and is placed within a light quantity distribution by arranging the first absolute light receiving elements 151 and the second absolute light receiving elements 152 in a mixed pattern (for example, alternately), two absolute light receiving element groups that include the first absolute light receiving element group 150D and the second absolute light receiving element group 150U can be arranged within the light quantity distribution. Therefore, a light receiving area can be surely increased and further reflected light can be effectively utilized.

Furthermore, according to the present embodiment, the first absolute light receiving element group 150D and the second absolute light receiving element group 150U, which are arranged on the board 120 to have the same circumferential-direction positions, receive reflected light from the first serial absolute pattern SP1 and the second serial absolute pattern SP2, which are formed on the rotating disc 110 to have the different circumferential-direction positions. In this way, signals having a phase difference of 180 degrees can be output. As a result, it is possible to improve the reliability of output signals of the absolute light receiving element groups 150.

Herein, the present invention is not limited to the embodiment and can have various alternative examples without departing from the object and the technical idea. Hereinafter, such alternative examples will be explained.

(1) When patterns have the same phase and arrangement of light receiving elements is deviated:

In the embodiment, it has been explained that the first absolute light receiving element group 150D and the second absolute light receiving element group 150U are arranged on the board 120 so that the circumferential-direction positions of these groups are the same, and the first serial absolute pattern SP1 and the second serial absolute pattern SP2 are formed on the rotating disc 110 so that these patterns corresponding to the same circumferential-direction position are deviated. However, the embodiment is not limited to this. On the contrary, the present invention may have a configuration that the first absolute light receiving element group 150D and the second absolute light receiving element group 150U are arranged on the board 120 so that the circumferential-direction positions of these groups are different, and the first serial absolute pattern SP1 and the second serial absolute pattern SP2 are formed on the rotating disc 110 so that these patterns corresponding to the same circumferential-direction position are the same.

Figure 6:
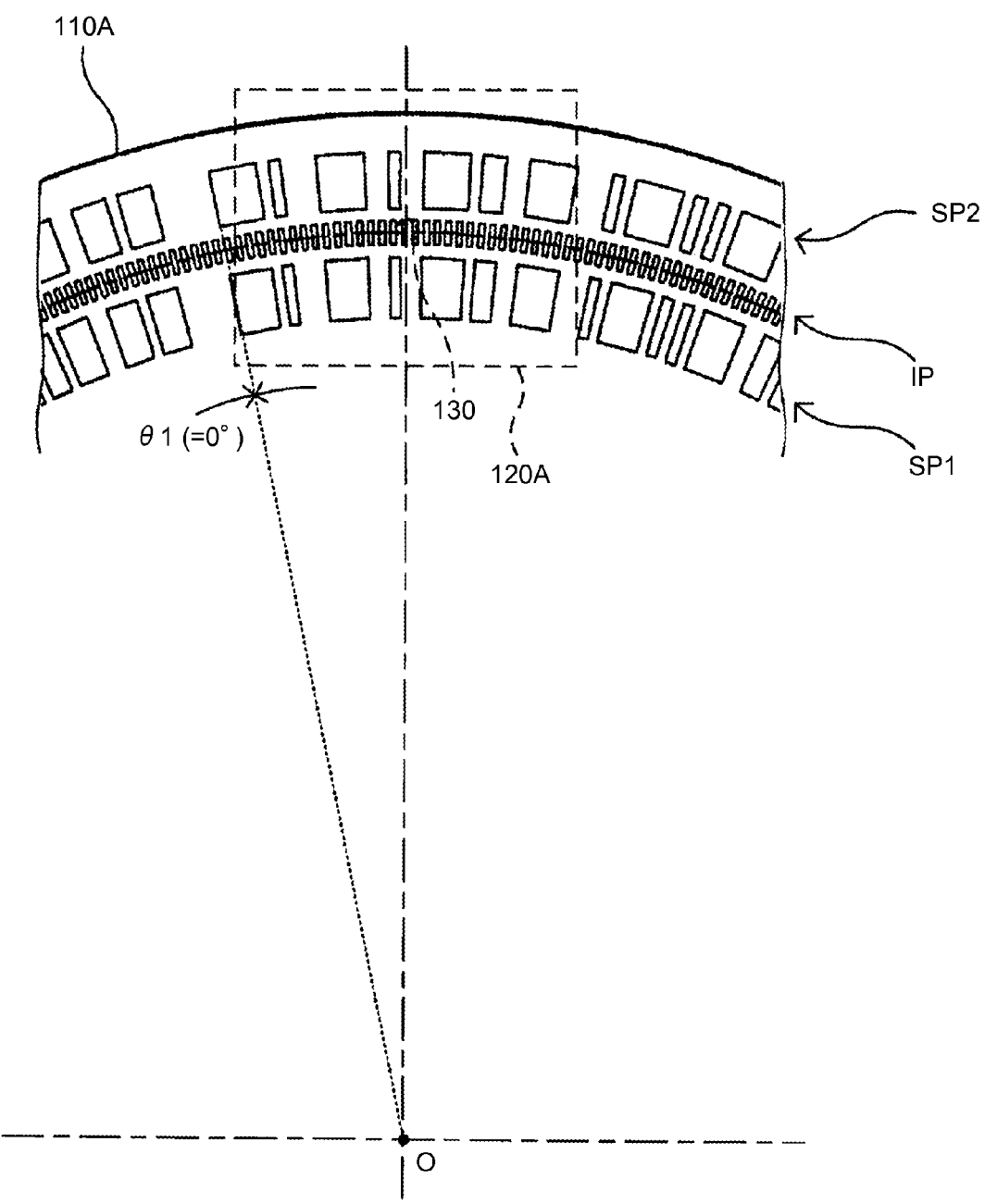
FIG. 6 is a plan view illustrating a part of a pattern forming surface of a rotating disc included in a reflection encoder according to an alternative example in which patterns have a coordinate phase and the arrangement of light receiving elements is changed.
Figure 7:
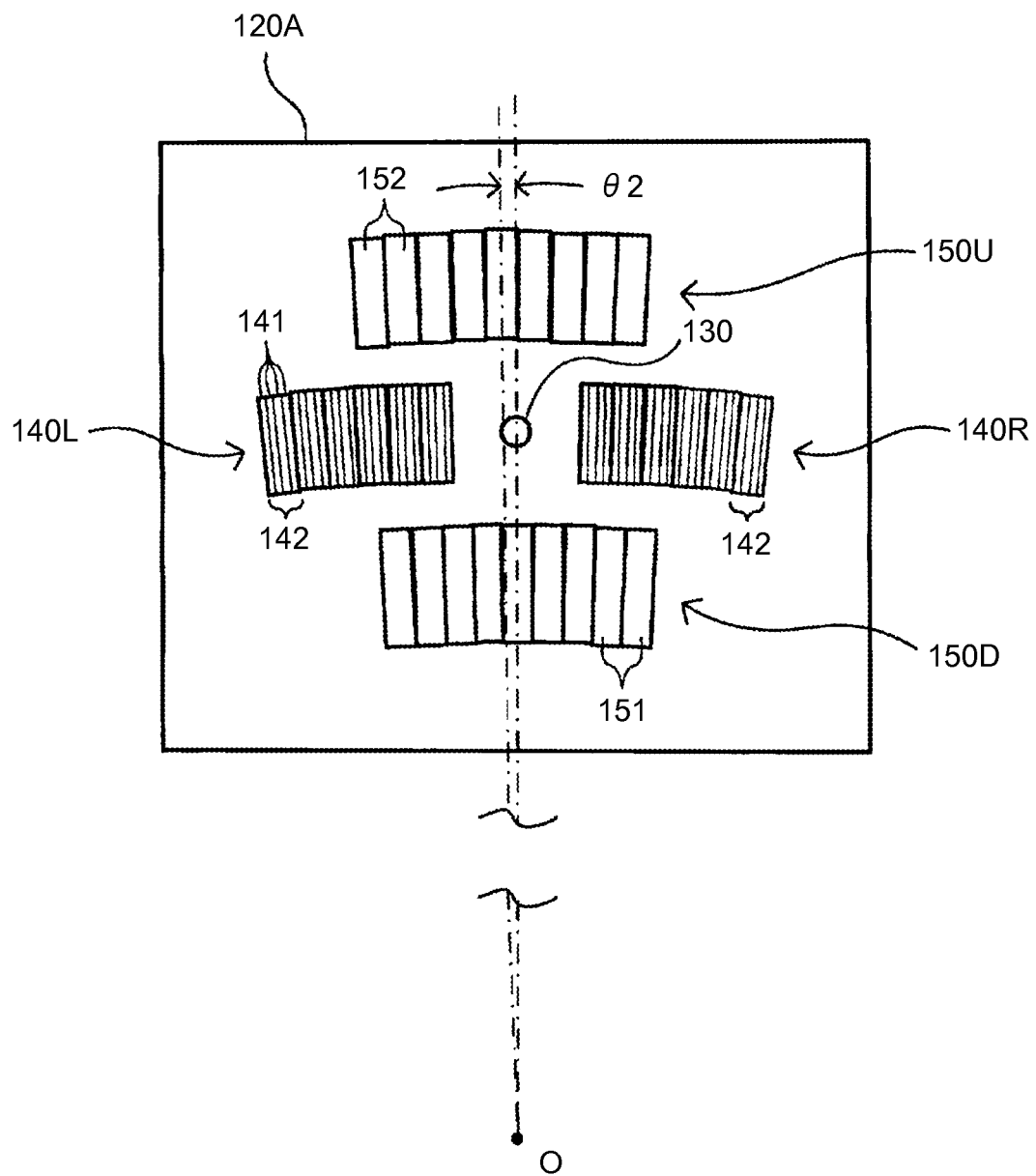
FIG. 7 is an arrangement diagram illustrating the arrangement of light receiving elements on a board included in the reflection encoder according to the alternative example in which patterns have a coordinate phase and the arrangement of the light receiving elements is changed.

The configuration of the reflection encoder 100 according to the present alternative example will be explained with reference to FIGS. 6 and 7. FIG. 6 is a plan view illustrating a part of a pattern forming surface of a rotating disc 110A included in the reflection encoder 100 according to the present alternative example. FIG. 7 is an arrangement diagram illustrating the arrangement of light receiving elements on a board 120A included in the reflection encoder 100.

As illustrated in FIG. 6, unlike with the embodiment described above, according to the present alternative example, a circumferential-direction deviation angle θ1 between the first serial absolute pattern SP1 and the second serial absolute pattern SP2 on the rotating disc 110A is zero degrees. In other words, the first serial absolute pattern SP1 and the second serial absolute pattern SP2 are formed on the rotating disc 110 in such a manner that they have the same pattern with respect to the same circumferential-direction position.

On the other hand, as illustrated in FIG. 7, the first absolute light receiving element group 150D and the second absolute light receiving element group 150U are arranged on the board 120A to be deviated by an angle θ2 in the circumferential direction (circumferential direction centering on the base position O'). Because the configuration other than this structure is similar to the embodiment, their descriptions are omitted.

As described above, in the present alternative example, the first absolute light receiving element group 150D and the second absolute light receiving element group 150U, which are arranged on the board 120A to have different circumferential-direction positions, can receive reflected light from the first serial absolute pattern SP1 and the second serial absolute pattern SP2, which are formed on the rotating disc 110A to have the same pattern with respect to the same circumferential-direction position, and thus can output signals whose phase difference is 180 degrees. As a result, similarly to the above described embodiment, it is possible to improve the reliability of output signals of the absolute light receiving elements.

Although it is not illustrated, the present invention may have a configuration that the first and second absolute light receiving element groups 150D and 150U are arranged on the board 120 to have different circumferential-direction positions and the first and second serial absolute patterns SP1 and SP2 are formed on the rotating disc 110 to have deviated patterns with respect to the same circumferential-direction position, by employing both configurations of the above described embodiment and the alternative example (1).

(2) When first and second absolute light receiving elements are arranged in a mixed pattern:

In the embodiment, it has been explained that the first absolute light receiving elements 151 and the second absolute light receiving elements 152 are separated to constitute the first absolute light receiving element group 150D and the second absolute light receiving element group 150U. However, the present invention is not limited to this. Absolute light receiving element groups may be constituted by mixing the first absolute light receiving elements 151 and the second absolute light receiving elements 152.

Figure 8:
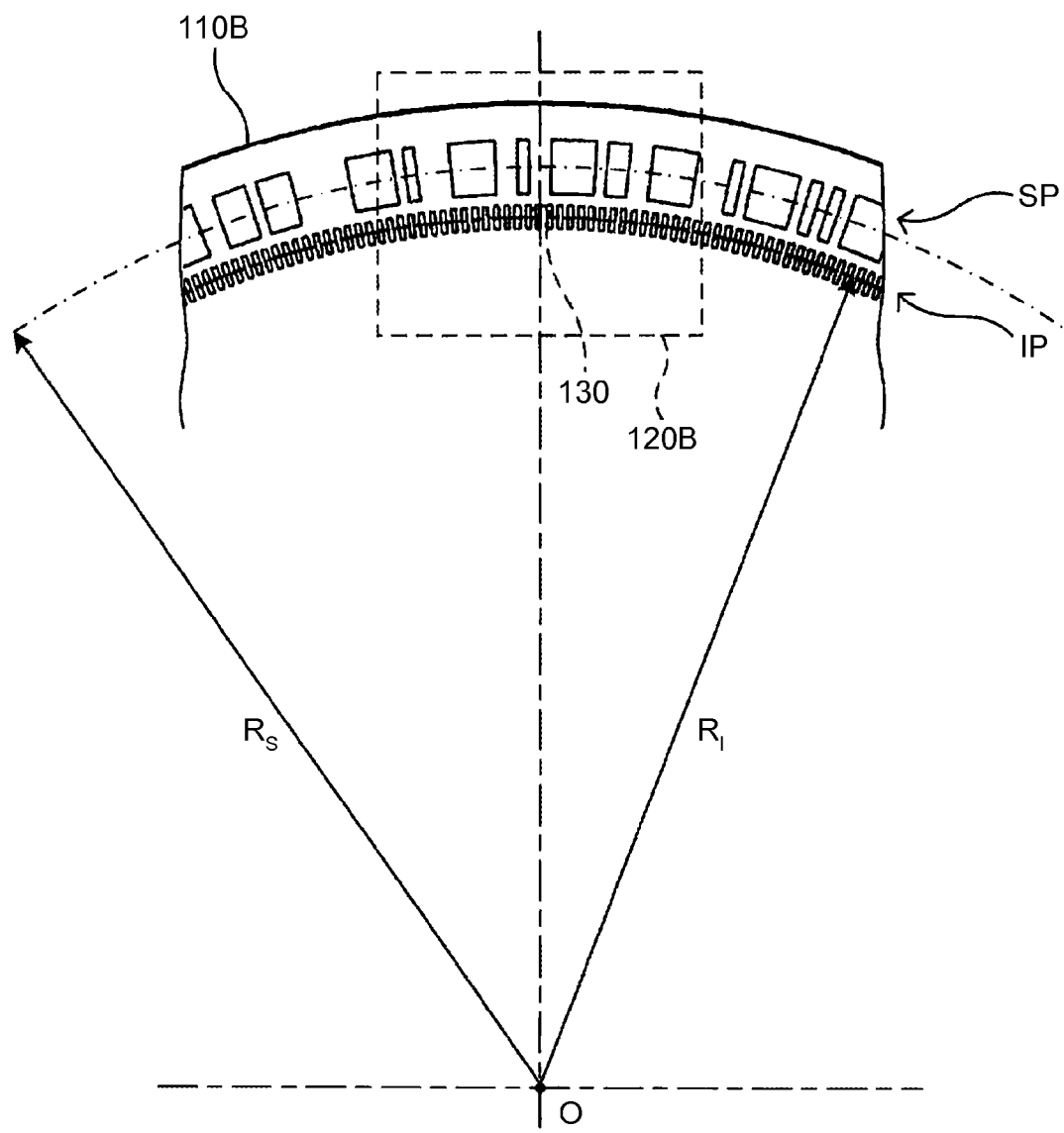
FIG. 8 is a plan view illustrating a part of a pattern forming surface of a rotating disc included in a reflection encoder according to an alternative example in which an absolute light receiving element group is arranged at only one side in a radial direction of a light source.

The configuration of the reflection encoder 100 according to the present alternative example will be explained with reference to FIGS. 8 and 9. FIG. 8 is a plan view illustrating a part of a pattern forming surface of a rotating disc 110B included in the reflection encoder 100 according to the present alternative example. FIG. 9 is an arrangement diagram illustrating the arrangement of light receiving elements on a board 120B included in the reflection encoder 100.

As illustrated in FIG. 8, an incremental pattern IP and a serial absolute pattern SP are concentrically formed on the rotating disc 110B along its circumferential direction. Unlike with the above described embodiment, in the present alternative example, only the one serial absolute pattern SP is formed on the outer circumferential side of the incremental pattern IP.

As illustrated in FIG. 9, an absolute light receiving element group 150' is placed at the outside of the light source 130 in the radial direction of the rotating disc 110B on a surface of the board 120B that is opposed to the rotating disc 110B. The absolute light receiving element group 150' includes the plurality of first absolute light receiving elements 151 and the plurality of second absolute light receiving elements 152 that receive reflected light from the serial absolute pattern SP. The first absolute light receiving elements 151 and the second absolute light receiving elements 152 are alternately arranged along the circumferential direction of the radius $kR_S$ centering on the base position O' described above. By employing such the alternate arrangement, the first absolute light receiving elements 151 and the second absolute light receiving elements 152 are arranged on the board 120B to have different circumferential-direction positions in unit of a predetermined angle. As a result, because these elements receive reflected light from the serial absolute pattern SP formed on the rotating disc 110B, they can output signals whose phase difference is 180 degrees. Because the configuration other than this structure is similar to the above described embodiment, their descriptions are omitted.

According to the present alternative example, the incremental light receiving element groups 140L and 140R are separated and arranged in the circumferential direction of the rotating disc 110B while placing the light source 130 therebetween, and the absolute light receiving element group 150' is placed at the outside of the light source 130 in the radial direction of the rotating disc 110B. As a result, the incremental light receiving element groups 140L and 140R and the absolute light receiving element group 150' can be arranged to surround the periphery of the light source 130 from three directions while the absolute light receiving elements 151 and 152 are continuously arranged. In this way, because the arrangement of the light receiving elements can correspond to concentric light quantity distribution centering on the light source 130, a light receiving area increases and thus reflected light can be effectively utilized.

The absolute light receiving element group 150' is constituted by alternately arraying the first absolute light receiving elements 151 and the second absolute light receiving elements 152. As a result, among the output signals of the first absolute light receiving elements 151 and the second absolute light receiving elements 152, a signal obtained from a pattern, which is not an unstable region, like turning points of the detection pattern is used to specify an absolute position, and thus the absolute position can be stably detected. Therefore, it is possible to improve the reliability of output signals of the absolute light receiving element group 150'.

As described above, it has been explained that the serial absolute pattern SP is formed on the outer circumferential side of the incremental pattern IP and the absolute light receiving element group 150' is placed at the outside of the light source 130 in its radial direction. On the contrary, the present invention may have the configuration that the serial absolute pattern SP is formed on the inner circumferential side of the incremental pattern IP and the absolute light receiving element group 150' is placed at the inside of the light source 130 in its radial direction. Furthermore, similarly to the above described embodiment, the serial absolute patterns SP1 and SP2 may be respectively formed on the inner and outer circumferential sides of the incremental pattern IP and the absolute light receiving element groups 150' are arranged at both sides of the light source 130 in its radial direction.

(3) When absolute light receiving element group is constituted by absolute light receiving elements having the same phase:

In the embodiment, it has been explained that the first absolute light receiving element group 150D and the second absolute light receiving element group 150U, which output signals whose phase difference is 180 degrees, are separated and arranged at both sides of the light source 130 in its radial direction. However, the present invention is not limited to this. The present invention may have a configuration that only one of the first absolute light receiving element group 150D and the second absolute light receiving element group 150U are arranged at both sides of the light source 130 in its radial direction. In this case, because the signals from the two absolute light receiving element groups arranged at both sides of the light source 130 in its radial direction are the same phase, it is not possible to obtain an effect of stably detecting an absolute position as described above. However, because the incremental light receiving element groups 140L and 140R and the absolute light receiving element groups can be arranged to surround the periphery of the light source 130 from four directions, it is possible to obtain an effect of increasing a light receiving area and of effectively utilizing reflected light. In this case, the groups may be arranged at not both sides but at only one side of the light source 130 in its radial direction. Also in this case, the incremental light receiving element groups 140L and 140R and the absolute light receiving element group can be arranged to surround the periphery of the light source 130 from three directions.

(4) Variation of configuration of arrangement of incremental light receiving element groups:

The following examples are considered in addition to the embodiment as the configuration of arrangement of incremental light receiving element groups. Herein, the incremental light receiving elements 141, which detect optical signals of A+ phase (0 degrees), B+ phase (90 degrees), A− phase (180 degrees), and B− phase (270 degrees) described above, are respectively referred to as 141a, 141b, 141c, and 141d.

Figure 10:
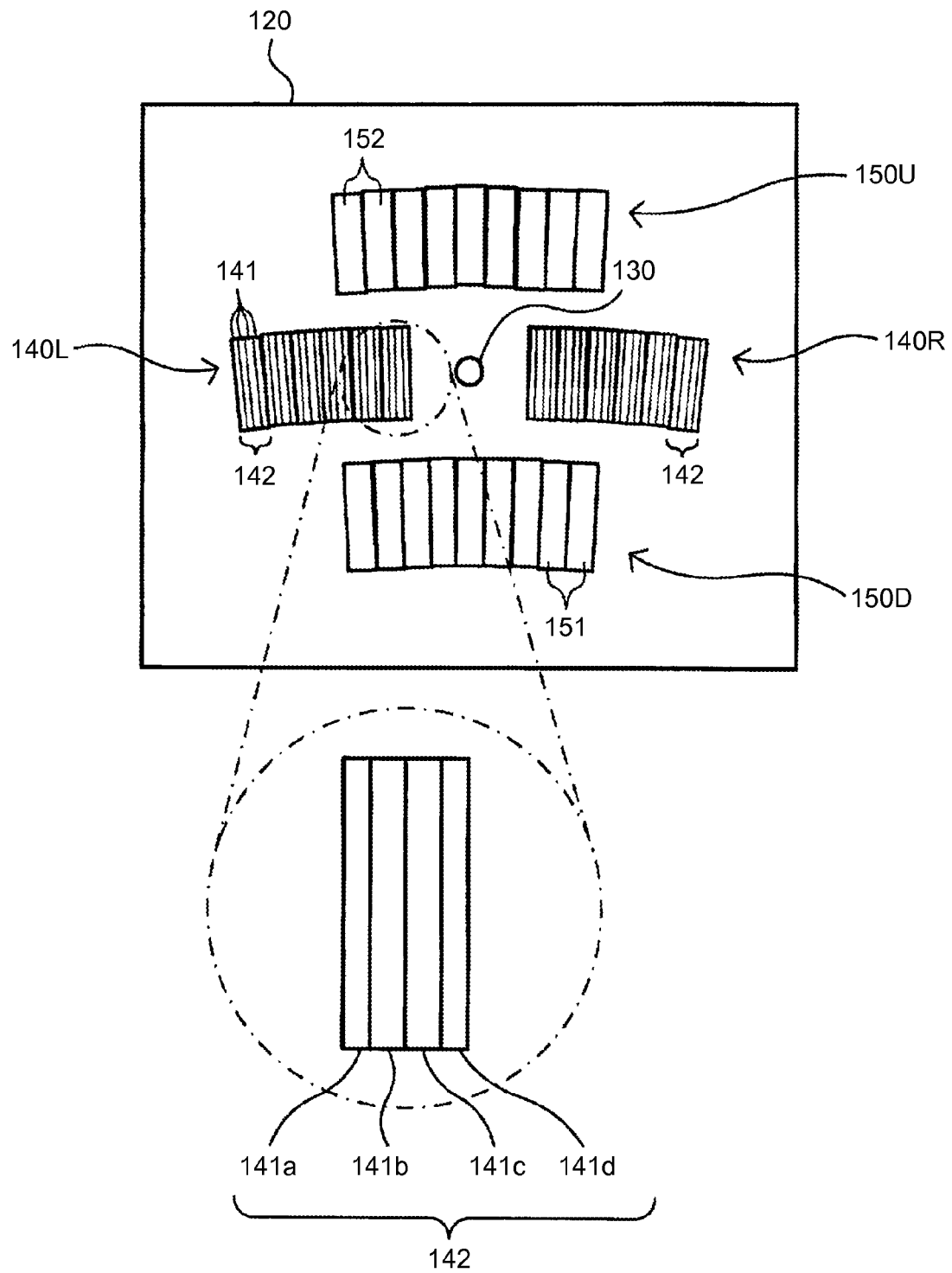
FIG. 10 is a diagram illustrating the configuration of arrangement of incremental light receiving element groups according to the present embodiment.

FIG. 10 is a diagram for comparison illustrating the configuration of arrangement of the incremental light receiving element groups 140L and 140R according to the above described embodiment. As illustrated in FIG. 10, the incremental light receiving elements 141a to 141d are set as one set (indicated by reference number 142 in the diagram), each of the incremental light receiving element groups 140L and 140R has the sets 142, and these groups are separated and arranged in the circumferential direction while placing the light source 130 therebetween.

Figure 11:
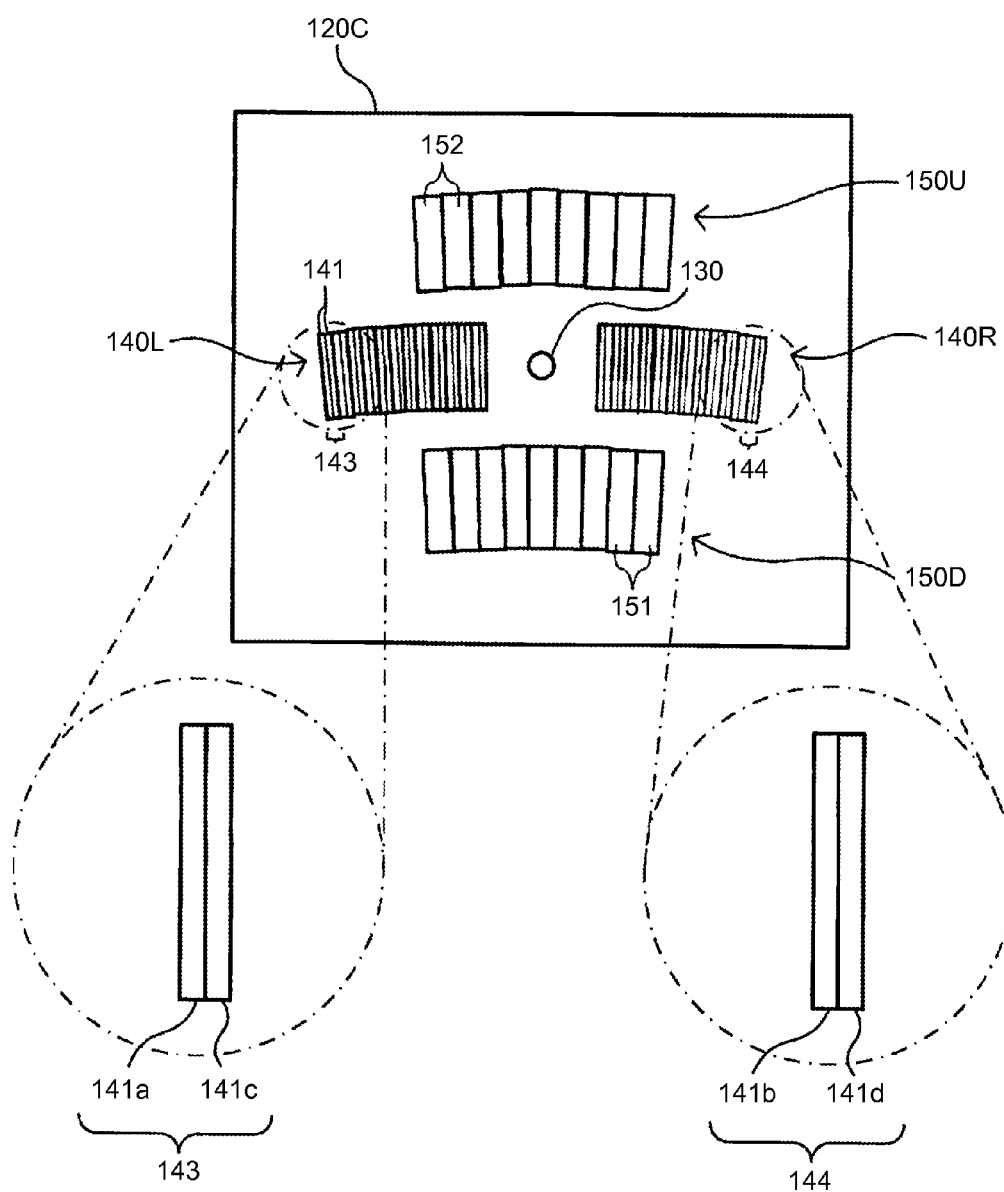
FIG. 11 is a diagram illustrating the configuration of another arrangement of the incremental light receiving element groups.

FIG. 11 is a diagram illustrating the configuration of another arrangement of the incremental light receiving element groups. In an example illustrated in FIG. 11, the incremental light receiving element group 140L has sets 143 assuming that the two incremental light receiving elements 141a and 141c are set as one set (indicated by reference number 143 in the diagram). The incremental light receiving element group 140R has sets 144 assuming that the two incremental light receiving elements 141b and 141d are set as one set (indicated by reference number 144 in the diagram). The incremental light receiving element groups 140L and 140R having the configuration are separated and arranged in the circumferential direction while placing the light source 130 therebetween.

Figure 12:
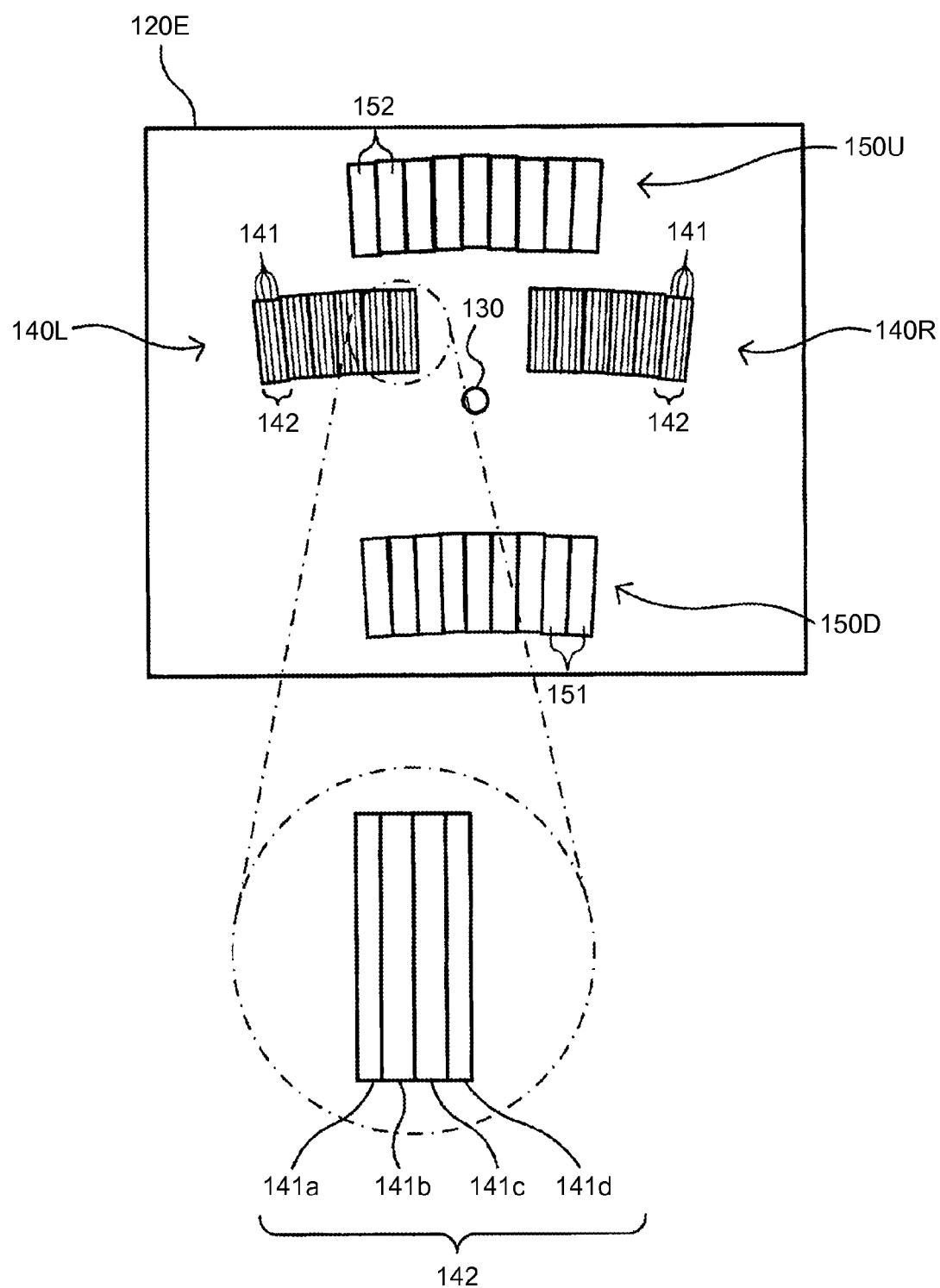
FIG. 12 is a diagram illustrating the configuration of still another arrangement of the incremental light receiving element groups.

FIG. 12 is a diagram illustrating the configuration of still another arrangement of the incremental light receiving element groups. In an example illustrated in FIG. 12, the incremental light receiving element groups 140L and 140R are arranged closer to the outer circumference than the light source 130 in its radial direction. The configuration of the incremental light receiving element groups 140L and 140R is the same as that of the above described embodiment. Therefore, each of the groups has the sets 142 assuming that the incremental light receiving elements 141a to 141d are set as one set (indicated by reference number 142 in the diagram). The incremental light receiving element groups 140L and 140R having the configuration are separated and arranged in the circumferential direction at positions closer to the outer circumference in its radial direction while placing the light source 130 therebetween. Moreover, in this example, it has been explained that the incremental light receiving element groups 140L and 140R are arranged closer to the outer circumference than the light source 130 in its radial direction. However, these groups may be arranged closer to the inner circumference in its radial direction.

In addition to the embodiments and the alternative examples described above, the present invention may employ examples that are obtained by appropriately combining the embodiments and the alternative examples.

Furthermore, although it is not explained, the present invention can be modified and appended without departing from the object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflection encoder comprising:
   a rotating unit configured to be rotatably arranged around a rotating shaft center and on which an incremental pattern is formed along a circumferential direction; and
   a board configured to be arranged opposite the rotating unit, and
   the board comprising:
      a light source configured to emit light toward the rotating unit; and
      an incremental light receiving element group configured to include a set including a plurality of incremental light receiving elements for receiving reflected light from the incremental pattern, the incremental light receiving elements of the set being separated and arranged in a line on the board in the circumferential direction of the rotating unit while placing the light source therebetween,
   wherein the incremental light receiving elements in the set respectively detect signals having corresponding phases in one period whose values increase sequentially.

2. The reflection encoder according to claim 1, wherein the incremental light receiving elements are arranged on the board so that positions of the elements in the radial direction of the rotating unit are a same as that of the light source.

3. The reflection encoder according to claim 1, wherein the incremental light receiving element group has a set of the plurality of incremental light receiving elements that detect signals having a phase difference.

4. The reflection encoder according to claim 1, wherein
   the rotating unit further has a serial absolute pattern that is formed thereon along the circumferential direction, and
   the board further comprises an absolute light receiving element group configured to include a plurality of absolute light receiving elements for receiving reflected light from the serial absolute pattern, the absolute light receiving elements being arranged on the board on at least one of an outside and an inside of the light source in a radial direction of the rotating unit.

5. The reflection encoder according to claim 4, wherein the absolute light receiving elements are arranged on the board on both sides of the outside and inside of the light source in the radial direction of the rotating unit.

6. The reflection encoder according to claim 4, wherein
   the absolute light receiving element group includes a plurality of first absolute light receiving elements and a plurality of second absolute light receiving elements, and
   the first absolute light receiving elements and the second absolute light receiving elements respectively output signals having different phases.

7. The reflection encoder according to claim 6, wherein
   the absolute light receiving element group is separated into a first absolute light receiving element group that includes the plurality of first absolute light receiving elements and a second absolute light receiving element group that includes the plurality of second absolute light receiving elements,
   one of the first and second absolute light receiving element groups is arranged on the outside of the light source in the radial direction and the other is arranged on the inside of the light source, and
   the serial absolute pattern has, on the rotating unit, a first serial absolute pattern formed at a position corresponding to the first absolute light receiving element group in the radial direction and a second serial absolute pattern formed at a position corresponding to the second absolute light receiving element group in the radial direction.

8. The reflection encoder according to claim 7, wherein
   the first and second absolute light receiving element groups are arranged so that circumferential-direction positions of the groups on the board are different to respectively output signals having different phases, and
   the first and second serial absolute patterns are formed to have a same pattern with respect to a same circumferential-direction position on the rotating unit.

9. The reflection encoder according to claim 7, wherein
   the first and second absolute light receiving element groups are arranged so that circumferential-direction positions of the groups on the board are a same, and
   the first and second serial absolute patterns are formed to have deviated patterns with respect to a same circumferential-direction position on the rotating unit so that the first and second absolute light receiving element groups respectively output signals having different phases.

10. The reflection encoder according to claim 1, wherein the incremental light receiving element group includes two sets that are separated and arranged in a line on the board in the circumferential direction of the rotating unit, and wherein the light source being provided on the board at a location between the two sets.

11. The reflection encoder according to claim 1, wherein the incremental light receiving element group includes more than two sets that are separated and arranged in a line on the board in the circumferential direction of the rotating unit, and wherein the incremental light receiving elements of the more than two sets being separated and arranged in a line on the board in the circumferential direction of the rotating unit while placing the light source therebetween.

12. The reflection encoder according to claim 1, wherein
   the incremental light receiving elements in the set respectively detect signals having first to fourth phases in one period whose values increase sequentially,
   the set includes first and second sub sets whose first sub set includes the incremental light receiving elements corresponding to the first and third phases and second sub set includes the incremental light receiving elements corresponding to the second and fourth phases, and the first and second sub sets in the set are separated and arranged on the board in the circumferential direction of the rotating unit while placing the light source therebetween.

13. A servo motor comprising:
a motor configured to rotate a shaft; and
a reflection encoder configured to be connected to the shaft to measure a position of the shaft, and
the reflection encoder comprising:
   a rotating unit configured to be rotatably arranged around a rotating shaft center in accordance with rotation of the shaft and on which an incremental pattern is formed along a circumferential direction; and
   a board configured to be arranged opposite the rotating unit, and
   the board comprising:
      a light source configured to emit light toward the rotating unit; and
      an incremental light receiving element group configured to include a set including a plurality of incremental light receiving elements for receiving reflected light from the incremental pattern, the incremental light receiving elements of the set being separated and arranged in a line on the board in the circumferential direction of the rotating unit while placing the light source therebetween,
wherein the incremental light receiving elements in the set respectively detect signals having corresponding phases in one period whose values increase sequentially.

14. The servo motor according to claim 13, wherein
the rotating unit further has a serial absolute pattern that is formed thereon along the circumferential direction, and
the board further comprises an absolute light receiving element group configured to include a plurality of absolute light receiving elements for receiving reflected light from the serial absolute pattern, the absolute light receiving elements being arranged on the board on at least one of an outside and an inside of the light source in a radial direction of the rotating unit.

15. The servo motor according to claim 13, wherein the incremental light receiving element group includes two sets that are separated and arranged in a line on the board in the circumferential direction of the rotating unit, and wherein the light source being provided on the board at a location between the two sets.

16. A servo unit comprising:
a motor configured to rotate a shaft;
a reflection encoder configured to be connected to the shaft to measure a position of the shaft; and
a control device configured to control rotation of the motor on the basis of the position detected by the reflection encoder, and
the reflection encoder comprising:
   a rotating unit configured to be rotatably arranged around a rotating shaft center in accordance with rotation of the shaft and on which an incremental pattern is formed along a circumferential direction; and
   a board configured to be arranged opposite the rotating unit, and
   the board comprising:
      a light source configured to emit light toward the rotating unit; and
      an incremental light receiving element group configured to include a set including a plurality of incremental light receiving elements for receiving reflected light from the incremental pattern, the incremental light receiving elements of the set being separated and arranged in a line on the board in the circumferential direction of the rotating unit while placing the light source therebetween,
wherein the incremental light receiving elements in the set respectively detect signals having corresponding phases in one period whose values increase sequentially.

17. The servo unit according to claim 16, wherein
the rotating unit further has a serial absolute pattern that is formed thereon along the circumferential direction, and
the board further comprises an absolute light receiving element group configured to include a plurality of absolute light receiving elements for receiving reflected light from the serial absolute pattern, the absolute light receiving elements being arranged on the board on at least one of an outside and an inside of the light source in a radial direction of the rotating unit.

18. The servo unit according to claim 16, wherein the incremental light receiving element group includes two sets that are separated and arranged in a line on the board in the circumferential direction of the rotating unit, and wherein the light source being provided on the board at a location between the two sets.

19. A reflection encoder comprising:
a rotating unit configured to be rotatably arranged around a rotating shaft center and on which an incremental pattern is formed along a circumferential direction; and
a board configured to be arranged opposite the rotating unit, and
the board comprising:
   a light source configured to emit light toward the rotating unit; and
   an incremental light receiving element group configured to include one or more sets of which each includes a plurality of incremental light receiving elements for receiving reflected light from the incremental pattern, the incremental light receiving elements in the set being arranged in a line on the board in the circumferential direction of the rotating unit, wherein
the set includes the incremental light receiving elements that respectively detect signals having first to fourth phases in one period whose values increase sequentially,
the set includes first and second sub sets whose first sub set includes the incremental light receiving elements corresponding to the first and third phases and second sub set includes the incremental light receiving elements corresponding to the second and fourth phases, and
the first and second sub sets in the set are separated and arranged on the board in the circumferential direction of the rotating unit while placing the light source therebetween.

20. A reflection encoder comprising:
a rotating unit configured to be rotatably arranged around a rotating shaft center and on which an incremental pattern is formed along a circumferential direction; and
a board configured to be arranged opposite the rotating unit, and
the board comprising:
   a light source configured to emit light toward the rotating unit; and
   an incremental light receiving element group configured to include a plurality of incremental light receiving elements for receiving reflected light from the incremental pattern, wherein
the incremental light receiving elements are separated and arranged on the board in the circumferential direction of the rotating unit while placing the light source therebetween, and the incremental light receiving elements are arranged in a radiation direction whose curvature is smaller than that of the incremental pattern.

21. The reflection encoder according to claim 20, wherein when an optical path distance of outgoing light from the light source to the rotating unit is d1, an optical path distance of reflected light from the rotating unit to the incremental light receiving element group is d2, and a distance from a center of rotation on the rotating unit to a central position of the incremental pattern is r, the incremental light receiving elements are arranged in the radiation direction whose center is a base position being away from the light source by a distance of r(d1+d2)/d1.

* * * * *